US008838888B2

(12) United States Patent
Ahmad et al.

(10) Patent No.: US 8,838,888 B2
(45) Date of Patent: Sep. 16, 2014

(54) CONDITIONAL WRITE PROCESSING FOR A CACHE STRUCTURE OF A COUPLING FACILITY

(75) Inventors: Riaz Ahmad, Gaithersburg, MD (US); David A. Elko, Austin, TX (US); Jeffrey W. Josten, San Jose, CA (US); Georgette Kurdt, Wappingers Falls, NY (US); Scott F. Schiffer, Poughkeepsie, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/423,640

(22) Filed: Mar. 19, 2012

(65) Prior Publication Data

US 2013/0246713 A1 Sep. 19, 2013

(51) Int. Cl.
*G06F 12/00* (2006.01)

(52) U.S. Cl.
USPC ............ 711/113; 711/154; 711/156; 711/142

(58) Field of Classification Search
CPC .......... G06F 12/0811; G06F 17/30289; G06F 12/0866; G06F 2212/46
USPC ............................ 711/118, 113, 154, E12.033
See application file for complete search history.

(56) References Cited

U.S. PATENT DOCUMENTS

| | | | |
|---|---|---|---|
| 5,317,739 A | 5/1994 | Elko et al. | |
| 5,455,942 A | 10/1995 | Mohan et al. | |
| 5,675,777 A * | 10/1997 | Glickman | 712/220 |
| 5,742,830 A | 4/1998 | Elko et al. | |
| 7,752,395 B1 | 7/2010 | Fair et al. | |
| 7,962,785 B2 | 6/2011 | Trika et al. | |
| 2002/0046334 A1* | 4/2002 | Wah Chan et al. | 712/223 |
| 2002/0194210 A1 | 12/2002 | Subramoney et al. | |
| 2003/0046492 A1 | 3/2003 | Gschwind et al. | |
| 2008/0320235 A1 | 12/2008 | Beckmann et al. | |
| 2009/0254782 A1* | 10/2009 | Bancel et al. | 714/53 |
| 2009/0300294 A1* | 12/2009 | Moyer et al. | 711/144 |
| 2010/0049954 A1* | 2/2010 | Shmueli et al. | 712/226 |
| 2011/0078381 A1 | 3/2011 | Heinrich et al. | |
| 2012/0117317 A1* | 5/2012 | Sheffler et al. | 711/103 |
| 2012/0185734 A1* | 7/2012 | Gilkerson et al. | 714/45 |

OTHER PUBLICATIONS

Josten, et al., "DB2's use of the coupling facility for data sharing", IBM Systems Journal, vol. 36, No. 2, 1997, pp. 327-351.

\* cited by examiner

*Primary Examiner* — Mardochee Chery

(74) *Attorney, Agent, or Firm* — Cantor Colburn LLP; William A. Kinnaman, Jr.

(57) ABSTRACT

A method for managing a cache structure of a coupling facility includes receiving a conditional write command from a computing system and determining whether data associated with the conditional write command is part of a working set of data of the cache structure. If the data associated with the conditional write command is part of the working set of data of the cache structure the conditional write command is processed as an unconditional write command. If the data associated with the conditional write command is not part of the working set of data of the cache structure a conditional write failure notification is transmitted to the computing system.

5 Claims, 4 Drawing Sheets

CONDITIONAL WRITE PROCESSING FOR A CACHE STRUCTURE OF A COUPLING FACILITY

BACKGROUND

The present invention relates to data management, and more specifically, to methods and systems for conditional write processing for a cache structure of a coupling facility.

In parallel computing systems, multiple computers or mainframes act together as a single system and share data using one or more coupling facilities. Data management middleware products running on the several systems participate in the data sharing environment by exploiting a cache structure, a lock structure and/or a list structure of the coupling facility. The cache structure allows the computing systems to store data in a high-performance cache that is accessible by all of the systems in the parallel computing system. The coupling facility maintains a shared directory that tracks the validity of individual data in each of the middleware local in-memory caches, which is used to maintain cache coherency and data integrity for the shared data across all middleware instances.

Certain kinds of write-intensive database activities such as batch jobs that modify most or all of the data items in a shared database can have the effect of overwhelming the cache structure of the coupling facility by flooding the structure with numerous changed data pages which are not part of the normal working set of the cache structure. For example, these activities may include database reorganizations, index restructurings, or making application-oriented updates across all data items. During such operations the cache structure of the coupling facility can become overwhelmed with a flood of write commands that displace the normal working set data in the cache structure, thereby causing temporary performance degradation or disruption and adversely affecting the performance of applications that are making use of the shared data.

SUMMARY

According to an exemplary embodiment, a method for managing a cache structure of a coupling facility includes receiving a conditional write command from a computing system and determining whether data associated with the conditional write command is part of a working set of data of the cache structure. If the data associated with the conditional write command is part of the working set of data of the cache structure the conditional write command is processed as an unconditional write command. If the data associated with the conditional write command is not part of the working set of data of the cache structure a conditional write failure notification is transmitted to the computing system, whereby the conditional write failure notification instructs the computing system to write the data associated with the conditional write command directly to a direct access storage device.

According to another exemplary embodiment, a computer program product for managing a cache structure of a coupling facility includes a tangible storage medium readable by a processing circuit and storing instructions for execution by the processing circuit for performing a method. The method includes receiving a conditional write command from a computing system and determining whether data associated with the conditional write command is part of a working set of data of the cache structure. If the data associated with the conditional write command is part of the working set of data of the cache structure the conditional write command is processed as an unconditional write command. If the data associated with the conditional write command is not part of the working set of data of the cache structure a conditional write failure notification is transmitted to the computing system, whereby the conditional write failure notification instructs the computing system to write the data associated with the conditional write command directly to a direct access storage device.

According to yet another exemplary embodiment, a system for managing a cache structure of a coupling facility, the system includes a processor unit configured to perform a method. The method includes receiving a conditional write command from a computing system and determining whether data associated with the conditional write command is part of a working set of data of the cache structure. If the data associated with the conditional write command is part of the working set of data of the cache structure the conditional write command is processed as an unconditional write command. If the data associated with the conditional write command is not part of the working set of data of the cache structure a conditional write failure notification is transmitted to the computing system, whereby the conditional write failure notification instructs the computing system to write the data associated with the conditional write command directly to a direct access storage device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
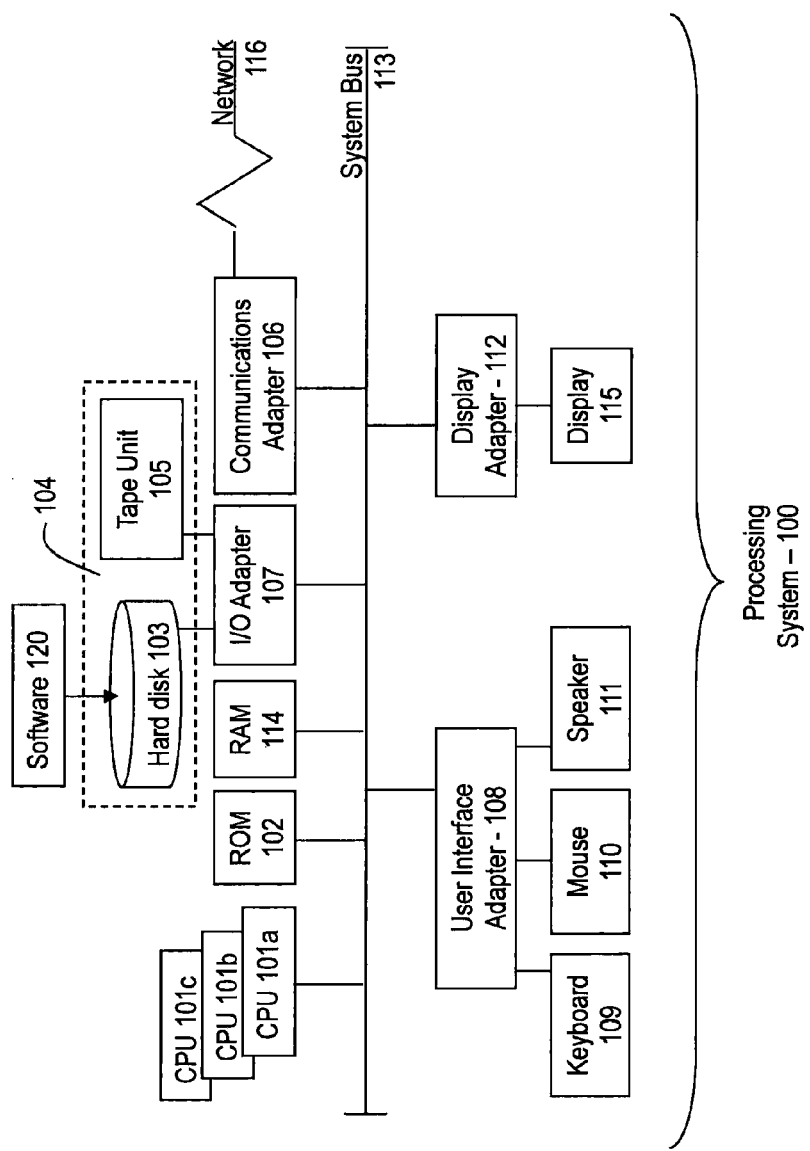
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, a direct access storage device or hard disk 103, and tape storage device 105 are collectively referred to herein as mass storage 104. A network adapter 106 interconnects bus 113 with an outside network 116 enabling data processing system 100 to communicate with other such systems and external storage devices. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Components Interface (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the z/OS® operating system from IBM Corporation to coordinate the functions of the various components shown in FIG. 1.

Examples of operating systems that may be supported by the system 100 include Windows 95, Windows 98, Windows NT 4.0, Windows XP, Windows 2000, Windows CE, Windows Vista, Macintosh, Java, LINUX, and UNIX, z/OS or any other suitable operating system. The system 100 also includes a network interface 116 for communicating over a network. The network can be a local-area network (LAN), a metro-area network (MAN), or wide-area network (WAN), such as the Internet or World Wide Web. Users of the system 100 can connect to the network through any suitable network interface 116 connection, such as standard telephone lines, digital subscriber line, LAN or WAN links (e.g., T1, T3), broadband connections (Frame Relay, ATM), and wireless connections (e.g., 802.11a, 802.11b, 802.11g).

As disclosed herein, the system 100 includes machine readable instructions stored on machine readable media (for example, the hard disk 104) for capture and interactive display of information shown on the screen 115 of a user. As discussed herein, the instructions are referred to as "software" 120. The software 120 may be produced using software development tools as are known in the art. Also discussed herein, the software 120 may also referred to as a "command line testing tool" 120, an "a testing interface" 120 or by other similar terms. The software 120 may include various tools and features for providing user interaction capabilities as are known in the art. The software 120 can include a database management subsystem such as DB2®, which manages structured data access requests and queries from end users and applications.

Figure 2:
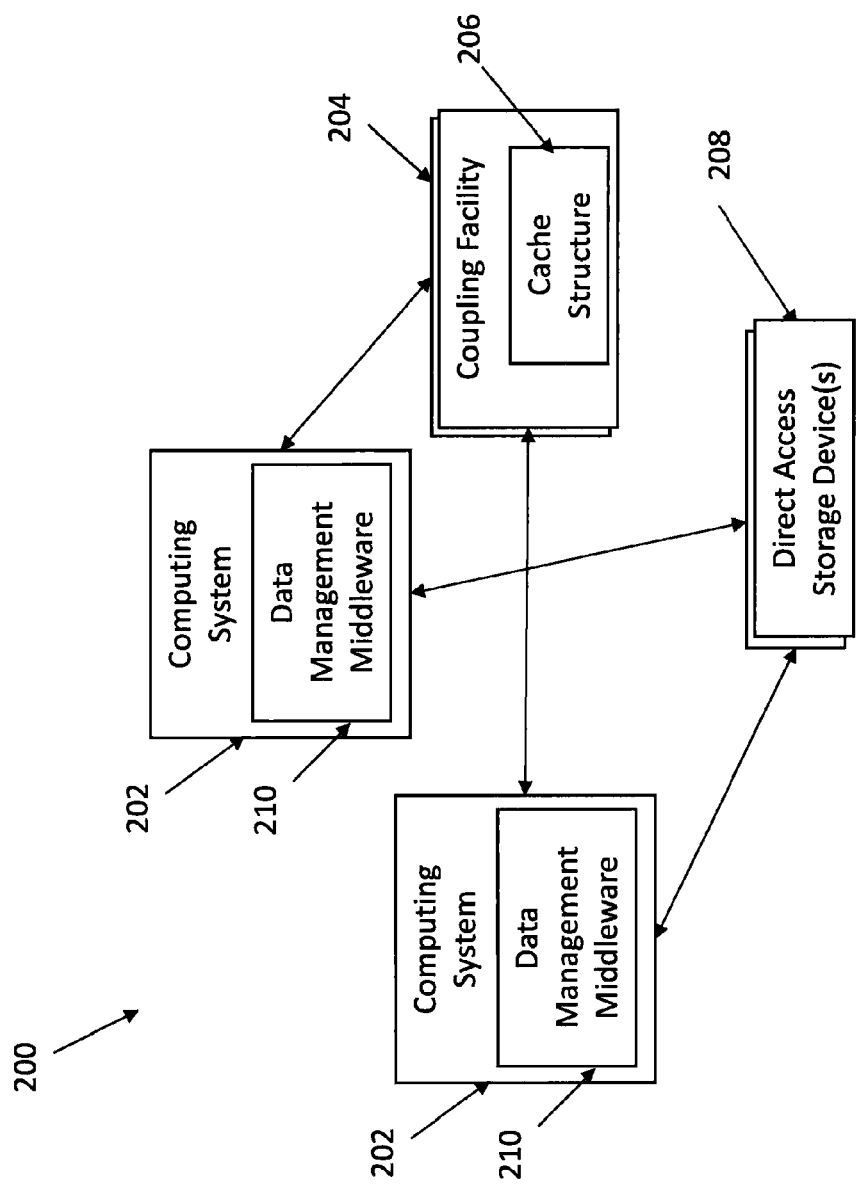
FIG. 2 is a block diagram that illustrates a parallel computing system including a coupling facility in accordance with an exemplary embodiment.

Referring now to FIG. 2, a block diagram illustrating a parallel computing system 200 including a coupling facility 204 is shown. The parallel computing system 200 includes a plurality of computing systems 202 that are each in communication with one or more coupling facilities 204. In exemplary embodiments, either or both of the coupling facilities 204 or the computing systems 202 may be a processing system as described with reference to FIG. 1. The coupling facility 204 includes a cache structure 206 which is a shared data storage utilized by the plurality of computing systems 202. In addition, the parallel computing system 200 includes one or more direct access storage devices 208. The direct access storage devices 208 are in communication with the plurality of computing systems 202.

In exemplary embodiments, the cache structure 206 of the coupling facility 204 is designed to process a conditional write command. The conditional write command allows the coupling facility 204 to conditionally perform data writes to the cache structure 206. A data write is a write of changed data that has been modified from its prior contents as a result of some program or end-user update. In exemplary embodiments, if the data being written to the cache structure 206 is determined by the coupling facility 204 to be part of the normal working set of data in the cache structure 206, the write operation will proceed normally. However, if the data being written is determined by the coupling facility 204 to not be part of the normal working set of data in the cache structure 206, the write operation will be rejected as a conditional write failure. The data management middleware 210, located on each of the plurality of computing systems 202, may be designed to respond to receiving a conditional write failure notification by directly writing the data the direct access storage device 208 bypassing, or writing around, the cache structure 206 of the coupling facility 204. In exemplary embodiments, once the write to the direct access storage device is completed 208 the data management middleware 210 may send a buffer invalidate signal via the coupling facility to invalidate obsolete locally-cached copies of the data on other systems 202, 210. In exemplary embodiments, the data in the working set of the cache structure 206 may be data that is frequently accessed. In addition, the data in the working set of data of the cache structure 206 may be data that is registered to one or more users, or computing systems 202.

In exemplary embodiments, the conditional write command protects the working set of data of the cache structure 206 by preventing the data in the working set from being displaced by large amounts of less frequently used data. In addition, the conditional write command also eliminates the processing overhead associated with casting the non-working-set data out to the direct access storage device 208 by preventing the non-working-set data from being written to the cache structure 206. Furthermore, the conditional write command minimizes processing delays that can result from the cache structure 206 becoming full of changed data.

In exemplary embodiments, the data management middleware 210 is designed to request conditional writes when appropriate. For example, the data management middleware 210 may be designed to request a conditional write for a write-intensive database activity such as database reorganizations, index restructurings, or making application-oriented update across all data items. In exemplary embodiments, write operations which are associated with such write-intensive activities will request conditional write processing. However, normal write operations that are not write-intensive will not request conditional write processing. In exemplary embodiments, the coupling facility 204 can provide feedback to the computing system 202 in response to receiving a conditional write command from the computing system 202. The feedback can be in the form of a notification sent to the computing system 202 indicating whether the conditional write operation succeeded or failed. In response to receiving a notification that the conditional write command failed from the coupling facility 204, the data management middleware 210 will write around the cache structure 206 of the coupling facility 204 and save the data to the direct access storage device 208. In exemplary embodiments, the data management middleware 210 may keep a locally-cached copy of the data in its local buffers on its system.

In exemplary embodiments, if the data management middleware 210 is performing software duplexing of the data contained in the cache structure 206 of the coupling facility 204, the data management middleware 210 also performs a write to a secondary cache copy of the structure if the write to the primary cache copy of the structure was successful. In cases where the write to the primary coupling facility was rejected as a conditional write failure, the data should not be written to the secondary coupling facility, in order to preserve synchronization between the primary and secondary coupling facilities cache structure instances.

In exemplary embodiments, the method for managing a cache structure of a coupling facility including conditional write processing protects the cache structure's working set data by preventing the working set data from being displaced by large amounts of less frequently used data. In addition, the method for managing a coupling facility cache structure including conditional write processing also avoids the coupling facilities cache structure processing overhead associated with writing the non-working-set data to the direct access data storage devices, i.e., with cast-out processing to move the changed data from the coupling facility to the direct access data storage devices.

Figure 3:
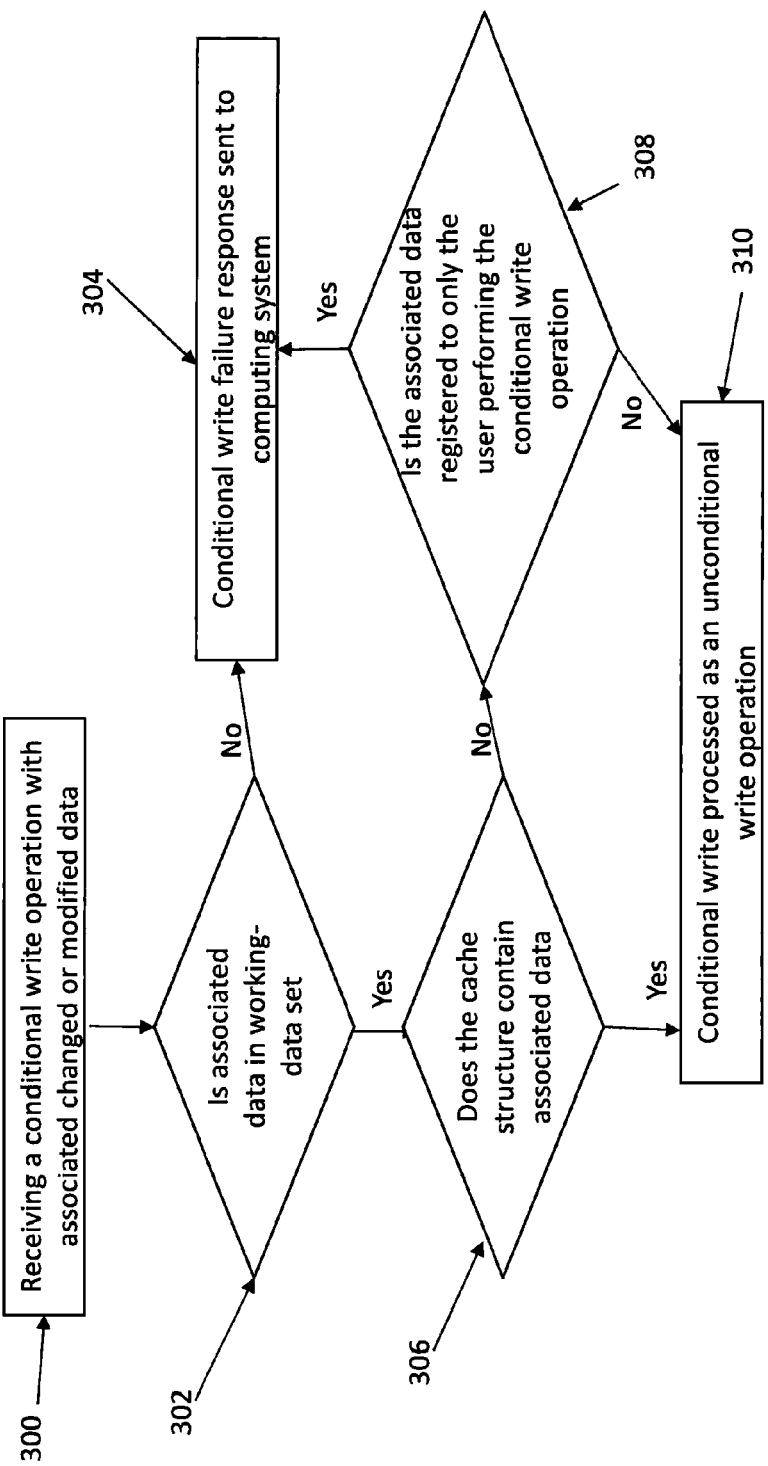
FIG. 3 is a flow diagram that illustrates a method for managing a cache structure of a coupling facility including conditional write processing in accordance with an exemplary embodiment.

Referring now to FIG. 3, a flow diagram that illustrates a method for managing a cache structure of a coupling facility including conditional write processing in accordance with an exemplary embodiment is shown. As shown at block 300, the method includes receiving a conditional write operation with associated data. Next, at decision block 302, the method includes determining if the associated data is in the working data set of the coupling facility, which is indicated by whether or not the particular data item is found to be present in the cache structure. If the associated data is not present, it is not part of the working set data for this workload. If the associated data is not in the working data set of the coupling facility, the conditional write is not processed and a conditional write failure message is sent to the source of the conditional write, as shown at block 304. If the associated data is in the working data set of the coupling facility, the method proceeds to decision block 306. At decision block 306, the method includes determining if the cache structure already contains the associated data, if so, then the conditional write is processed as an unconditional write operation, as shown at block 310. If the cache structure does not already contain the associated data, the method includes determining if the associated data has more than one registered user, as shown at decision block 308. In exemplary embodiments, determining if the associated data has more than one registered user includes determining that the only registered user is the user who is performing the write. If the associated data is registered to one or more users other than the user performing the conditional write, the conditional write is processed as an unconditional write operation, as shown at block 310. If the associated data is only registered to the user performing the conditional write, the conditional write is not processed and a conditional write failure message is sent to the source of the conditional write, as shown at block 304. In exemplary embodiments, the conditional write failure message indicates that the write operation was rejected because the associated data being written was not part of the normal working set of the coupling facility.

Figure 4:
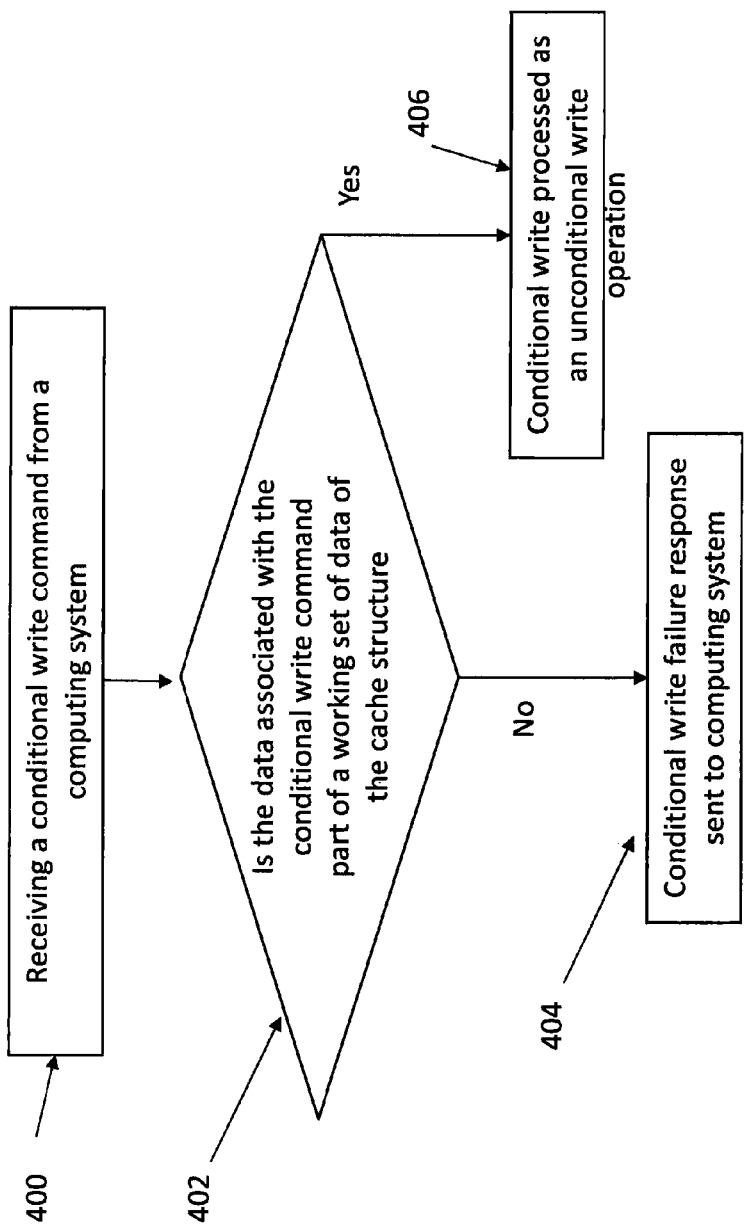
FIG. 4 is a flow diagram that illustrates another method for managing a cache structure of a coupling facility including conditional write processing in accordance with an exemplary embodiment is shown.

Referring now to FIG. 4, a flow diagram that illustrates a method for managing a cache structure of a coupling facility including conditional write processing in accordance with an exemplary embodiment is shown. As shown at block 400, the method includes receiving a conditional write command from a computing system. Next, at decision block 402, it is determined if the data associated with the conditional write command is part of a working set of data of the cache structure. If the data associated with the conditional write command is part of a working set of data of the cache structure the conditional write command is processed as an unconditional write operation, as shown at block 406. If the data associated with the conditional write command is not part of a working set of data of the cache structure a conditional write failure response sent to computing system, as shown at block 404.

In exemplary embodiments, the coupling facility 204 processes conditional write operations received from the data management middleware 210 of the one or more computing systems 202 and determines whether the computing system 202 should write-around the cache structure 206. By having the coupling facility 204 process the conditional write operations rather than permitting the computing systems 202 to determine when to write around the coupling facility 204, the coupling facility is able to maintain cache coherency and data integrity for the shared data across the plurality of computing systems 202 and the data management middleware instances 210.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for managing a cache structure of a coupling facility, the system comprising:
   a processor unit configured to perform a method comprising:
   receiving a conditional write command from a computing system;
   determining whether a data associated with the conditional write command is part of a working set of data of the cache structure;
   processing the conditional write command as an unconditional write command in the event the data associated with the conditional write command is part of the working set of data of the cache structure;
   transmitting a conditional write failure notification to the computing system in the event the data associated with the conditional write command is not part of the working set of data of the cache structure, whereby the conditional write failure notification instructs the computing system to write the data associated with the conditional write command directly to a direct access storage device;

determining whether the data associated with the conditional write command is registered to a user other than the user performing the conditional write command; and processing the conditional write command as an unconditional write command in the event the data associated with the conditional write command is registered to a user other than the user performing the conditional write command.

2. The system of claim 1, wherein the working set of data of the cache structure includes a set of data that is registered to one or more users.

3. The system of claim 1, wherein the working set of data of the cache structure includes a set of data that is frequently accessed.

4. The system of claim 1, wherein the conditional write failure notification instructs the computing system to write the data associated with the conditional write command directly to a direct access storage device.

5. The system of claim 1, wherein the method further comprises:

transmitting the conditional write failure notification to the computing system in the event the data associated with the conditional write command is registered to only the user requesting the conditional write command.

* * * * *